US009058332B1

(12) United States Patent
Darby et al.

(10) Patent No.: US 9,058,332 B1
(45) Date of Patent: Jun. 16, 2015

(54) BLENDED RANKING OF DISSIMILAR POPULATIONS USING AN N-FURCATED NORMALIZATION TECHNIQUE

(71) Applicant: Google Inc., Mountain View, CA (US)

(72) Inventors: Matthew Thomas Darby, San Francisco, CA (US); Naga Naresh Karuturi, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 45 days.

(21) Appl. No.: 13/729,158

(22) Filed: Dec. 28, 2012

Related U.S. Application Data

(60) Provisional application No. 61/643,181, filed on May 4, 2012.

(51) Int. Cl.
*G06F 17/30* (2006.01)

(52) U.S. Cl.
CPC .................................. *G06F 17/3005* (2013.01)

(58) Field of Classification Search
CPC .................................. G06F 17/30; G06F 17/00
See application file for complete search history.

(56) References Cited

U.S. PATENT DOCUMENTS

| | | | | |
|---|---|---|---|---|
| 8,302,030 | B2 * | 10/2012 | Soroca et al. | 715/810 |
| 8,311,888 | B2 * | 11/2012 | Ramer et al. | 705/14.64 |
| 8,364,540 | B2 * | 1/2013 | Soroca et al. | 705/14.64 |
| 2009/0222329 | A1 * | 9/2009 | Ramer et al. | 705/10 |
| 2009/0234711 | A1 * | 9/2009 | Ramer et al. | 705/10 |
| 2009/0234861 | A1 * | 9/2009 | Ramer et al. | 707/10 |
| 2009/0240568 | A1 * | 9/2009 | Ramer et al. | 705/10 |
| 2009/0240569 | A1 * | 9/2009 | Ramer et al. | 705/10 |
| 2009/0240586 | A1 * | 9/2009 | Ramer et al. | 705/14 |
| 2010/0063877 | A1 * | 3/2010 | Soroca et al. | 705/14.45 |
| 2010/0076994 | A1 * | 3/2010 | Soroca et al. | 707/769 |
| 2010/0094878 | A1 * | 4/2010 | Soroca et al. | 707/748 |
| 2011/0258049 | A1 * | 10/2011 | Ramer et al. | 705/14.66 |
| 2012/0173358 | A1 * | 7/2012 | Soroca et al. | 705/26.3 |
| 2012/0173359 | A1 * | 7/2012 | Soroca et al. | 705/26.3 |
| 2012/0173360 | A1 * | 7/2012 | Soroca et al. | 705/26.3 |
| 2012/0173361 | A1 * | 7/2012 | Soroca et al. | 705/26.3 |
| 2012/0173362 | A1 * | 7/2012 | Soroca et al. | 705/26.3 |
| 2012/0173363 | A1 * | 7/2012 | Soroca et al. | 705/26.3 |
| 2012/0173364 | A1 * | 7/2012 | Soroca et al. | 705/26.3 |
| 2012/0173365 | A1 * | 7/2012 | Soroca et al. | 705/26.3 |

(Continued)

OTHER PUBLICATIONS

Anderson, Ashton, Daniel Huttenlocher, Jon Kleinberg, and Jure Leskovec. "Effects of user similarity in social media." In Proceedings of the fifth ACM international conference on Web search and data mining, ACM, 2012, pp. 703-712.*

(Continued)

*Primary Examiner* — Farhan Syed
(74) *Attorney, Agent, or Firm* — Amin, Turocy & Watson, LLP

(57) ABSTRACT

Systems and methods for blending dissimilar, ordered populations into a single selection for users are disclosed herein. In an aspect, content items belonging to distinct parent populations which display a large disparity in the value which is used for ranking purposes, can be displayed together in a single continuously ranked list for simple browsing and selection by users. Further, a score can be assigned to the respective media content items based at least in part on a median value of a distribution of media content items corresponding to the respective parent populations and this score can be used as a normalized, universal value with which to rank content from all dissimilar populations together.

22 Claims, 12 Drawing Sheets

(56) References Cited

U.S. PATENT DOCUMENTS

| | | | |
|---|---|---|---|
| 2012/0173366 A1* | 7/2012 | Soroca et al. | 705/26.3 |
| 2012/0173367 A1* | 7/2012 | Soroca et al. | 705/26.3 |
| 2012/0173368 A1* | 7/2012 | Soroca et al. | 705/26.3 |
| 2012/0173369 A1* | 7/2012 | Soroca et al. | 705/26.3 |
| 2012/0173370 A1* | 7/2012 | Soroca et al. | 705/26.3 |
| 2012/0173371 A1* | 7/2012 | Soroca et al. | 705/26.3 |
| 2012/0173372 A1* | 7/2012 | Soroca et al. | 705/26.3 |
| 2012/0173373 A1* | 7/2012 | Soroca et al. | 705/26.3 |
| 2012/0173374 A1* | 7/2012 | Soroca et al. | 705/26.3 |
| 2012/0173375 A1* | 7/2012 | Soroca et al. | 705/26.3 |
| 2012/0173376 A1* | 7/2012 | Soroca et al. | 705/26.3 |
| 2012/0173377 A1* | 7/2012 | Soroca et al. | 705/26.3 |
| 2012/0173378 A1* | 7/2012 | Soroca et al. | 705/26.3 |
| 2012/0173379 A1* | 7/2012 | Soroca et al. | 705/26.3 |
| 2012/0179562 A1* | 7/2012 | Soroca et al. | 705/26.3 |
| 2012/0179563 A1* | 7/2012 | Soroca et al. | 705/26.3 |
| 2012/0179564 A1* | 7/2012 | Soroca et al. | 705/26.3 |
| 2012/0179565 A1* | 7/2012 | Soroca et al. | 705/26.3 |
| 2012/0179566 A1* | 7/2012 | Soroca et al. | 705/26.3 |
| 2012/0179567 A1* | 7/2012 | Soroca et al. | 705/26.3 |
| 2012/0179568 A1* | 7/2012 | Soroca et al. | 705/26.3 |
| 2012/0185349 A1* | 7/2012 | Soroca et al. | 705/26.3 |
| 2012/0209705 A1* | 8/2012 | Ramer et al. | 705/14.51 |
| 2012/0209706 A1* | 8/2012 | Ramer et al. | 705/14.51 |
| 2012/0209707 A1* | 8/2012 | Ramer et al. | 705/14.51 |
| 2012/0209708 A1* | 8/2012 | Ramer et al. | 705/14.51 |
| 2012/0209709 A1* | 8/2012 | Ramer et al. | 705/14.51 |
| 2012/0209710 A1* | 8/2012 | Ramer et al. | 705/14.51 |
| 2012/0215602 A1* | 8/2012 | Ramer et al. | 705/14.13 |
| 2012/0215612 A1* | 8/2012 | Ramer et al. | 705/14.23 |
| 2012/0215622 A1* | 8/2012 | Ramer et al. | 705/14.44 |
| 2012/0215623 A1* | 8/2012 | Ramer et al. | 705/14.44 |
| 2012/0215624 A1* | 8/2012 | Ramer et al. | 705/14.44 |
| 2012/0215625 A1* | 8/2012 | Ramer et al. | 705/14.44 |
| 2012/0215626 A1* | 8/2012 | Ramer et al. | 705/14.44 |
| 2012/0215635 A1* | 8/2012 | Ramer et al. | 705/14.51 |
| 2012/0215639 A1* | 8/2012 | Ramer et al. | 705/14.53 |
| 2012/0215640 A1* | 8/2012 | Ramer et al. | 705/14.55 |
| 2013/0055097 A1* | 2/2013 | Soroca et al. | 715/738 |
| 2013/0254035 A1* | 9/2013 | Ramer et al. | 705/14.62 |
| 2013/0304581 A1* | 11/2013 | Soroca et al. | 705/14.64 |

OTHER PUBLICATIONS

Pal, Aditya. User Classification in Online Communities. Diss. University of Minnesota, 2012, pp. 1-162.*

Wang, Xin-Jing, and Lei Zhang. "Relevance Feedback for Content-Based Information Retrieval." In Encyclopedia of Database Systems, pp. 2379-2381. Springer US, 2009.*

Mathes, Adam. "Folksonomies—Cooperative Classification and Communication Through Shared Metadata." 2004, pp. 1-13.*

* cited by examiner

BLENDED RANKING OF DISSIMILAR POPULATIONS USING AN N-FURCATED NORMALIZATION TECHNIQUE

CROSS REFERENCED TO RELATED APPLICATION

This application claims the benefit of U.S. Provisional Application No. 61/643,181, filed May 4, 2012 and entitled "Browse Rank Scoring of Content Items", which is incorporated by reference herein in its entirety.

TECHNICAL FIELD

This disclosure relates to blending populations of dissimilar media items using normalization into a single search result selection list.

BACKGROUND

Consumers of media content often select content from an ordered list of search results generated from a search engine query or algorithmically generated browse-able lists. Content options are often ranked in an order according to relevancy and/or popularity of an item queried. For instance, a user may desire to download a weather app, whereby the list of "top weather apps" is ranked by popularity to viewers based on commonly employed popularity factors (e.g. greatest aggregate number of clicks, number of downloads, number of views, etc.). A list generated from a popularity factor such as greatest number of downloads typically generates a list of apps that users can view for free. However, free content results may be unrepresentative of the breadth and quality of total available content. In particular, paid-for content is often drowned out in results that are a function of greatest number of views, but still may be considered preferable for user consumption due to premium features offered with the paid-for content. Results biased toward media items belonging to a single population group (e.g. such as most viewed media items) limit a user's choice of consumable media items to a relatively homogenous set of media item options that may not properly represent content that may be desirable to respective users.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with blending dissimilar ordered populations of media content items into a single search result selection or browse-able list for users to choose from. In an aspect, a system is provided including a memory having stored thereon computer executable components, and a processor configured to execute the following computer executable components stored in the memory: an analysis component that analyzes respective media content items belonging to respective parent populations based at least in part on user browsing information; a scoring component that assigns a score to the respective media content items based at least in part on median value of a distribution of media content items corresponding to respective parent populations; a ranking component that ranks the respective media content items based at least in part on the score; and an ordering component that orders the respective media content items based at least in part on the ranking.

In various aspects, the system can further include a presentation component that generates a display of the ordered media content items. In another aspect, the media content items are at least one of movie items, audio items, image items, downloadable applications, or other downloadable software or media. In another aspect, the movie items belong to respective parent populations comprising at least one of free movies or paid-for movies. In yet another aspect, the system can include an advertisement component that applies an advertisement to a section of the search result list.

In accordance with another aspect, a method includes using a processor to execute computer executable instructions stored in a memory to perform the following acts: analyzing respective media content items belonging to respective parent populations based at least in part on user browsing information; assigning a score to the respective media content items based at least in part on a median value of a distribution of media content items corresponding to the respective parent populations; ranking the respective media content items based at least in part on the score; and ordering the respective media content items based at least in part on the ranking.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

DETAILED DESCRIPTION

Overview

Figure 1:
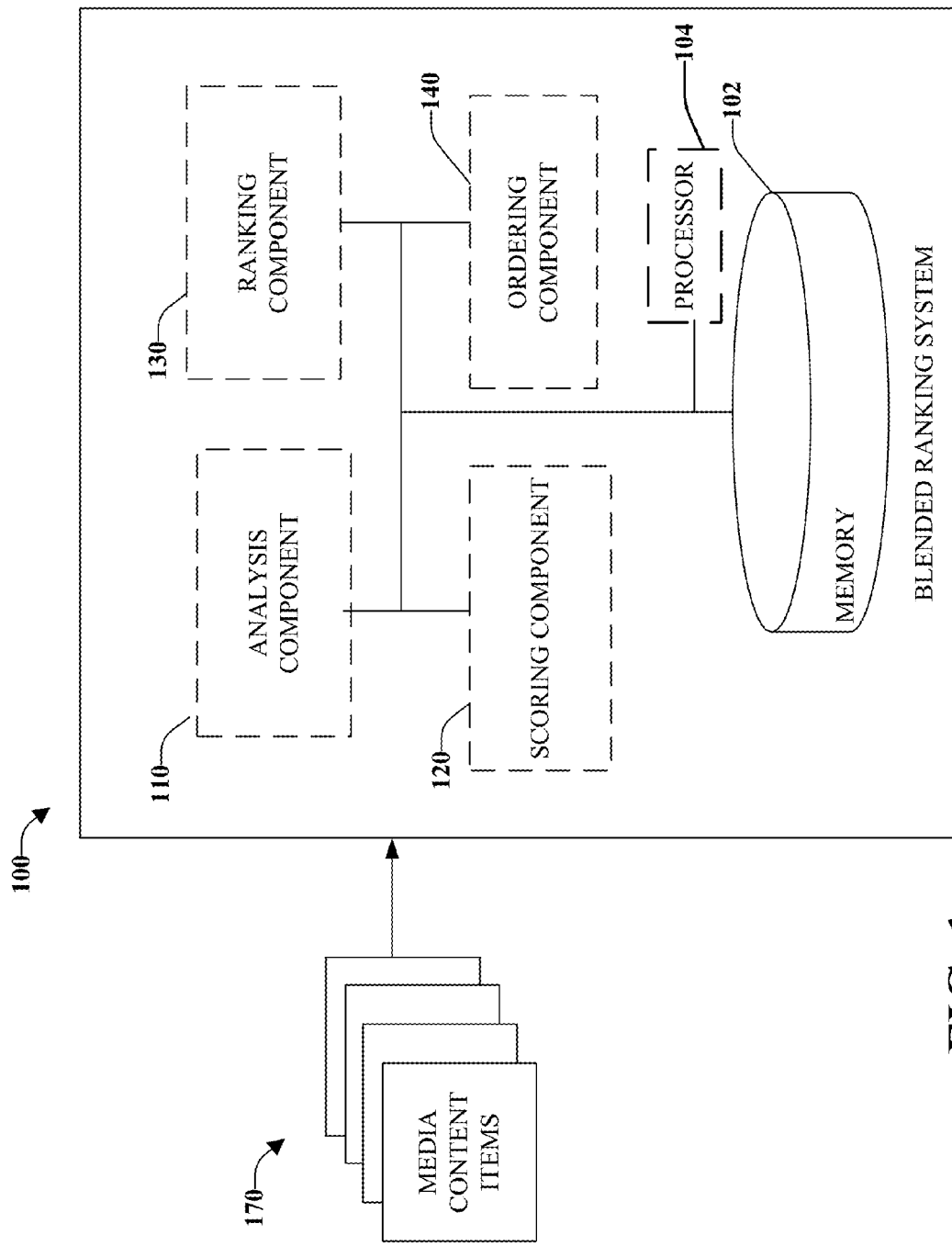
FIG. 1 illustrates an example non-limiting blended ranking system for blending ranking of dissimilar populations of media content into a single selection with one or more implementations.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter disclosed in this disclosure relates to a system for blending dissimilar, ordered populations of content into a single selection. Often when a user is presented with a ordered list of content (such as a list of downloadable apps, movies or music), the ordering of the list usually reflects the greatest popularity among users (e.g. media items that receive the most user interest are listed first). Relevance-based and popularity-based results are generated in accordance with one or more algorithms employed by search engines. Ranking algorithms are efficient at evaluating popularity of a media item and can affix weights to various relevancy parameters or popularity parameters to determine popularity of respective media items.

For instance, a media item that is free, or low cost may secure a greater weight than a higher priced media item. Typical ranking algorithms will order items receiving more aggregate downloads or views (typically free or low cost items) higher than those items receiving less aggregate views (typically higher-priced media items) which can disadvantage one population over another due to a limiting rank metric (e.g. ranking greater aggregate viewed media items over lower aggregate viewed media items). A user "view" means consumption of a content item (e.g. media content or otherwise), a click (e.g. clicking play on a streaming movie), a download (e.g. downloading an application), installation (e.g. installing an application).

Although popularity based search results (for purposes of this disclosure search results also includes results displayed in a browse-able list) provide some utility to users, such popularity based search algorithms tend to skew search results towards a small fraction of media items based on generic popularity parameters leading to a sub-par user experience. Additionally, such popularity based search results can leave vendors of media content at a disadvantage due to infrequent and inadequate display of the vendor's media content to users. In an instance, popularity based search rankings typically display free media content items at a significantly higher magnitude than paid-for media content (e.g. media content which a user purchases to consume) which consequently subjects users to select from a less variegated and more homogenous set of search result options.

Free and cost effective media items often receive more views and greater user traffic over paid-for content due to low barriers to user consumption, greater availability, and unawareness of other media content options for consumption. Thus amongst a population of paid-for media content items and a population of free media content items, the free media content has a greater probability of securing higher rank than paid-for content, appear with greater frequency and in greater number in search result lists. However, although a user may not prefer to consume free media content he/she may consume such media content due to unawareness of alternative media content availability and lack of exposure to other options (e.g. paid-for media content).

Conventionally, a user searching for a downloadable weather app will likely be shown search results of only free weather apps (for purposes of this disclosure, an app also includes any download-able or installable software, movie, music track or other media item) rather than options to view weather apps for purchase due to the higher number of views of free weather apps. However, such free weather apps may feature poor quality, missing features, or other such undesirable qualities which are absent in paid-for weather apps. A search engine or browse-able list that ranks results as a function of aggregate number of views can present a user with a skewed list of results less indicative of a user's consumption preference. A common solution to this problem is to display multiple lists to a user, such as "top paid apps" and "top free apps". By blending together results from various populations, the user can instead choose from a single list of ranked results including both free and paid-for media content options that may be more relevant to a user's media content preference. The blending algorithm described here can incorporate any number of such populations into a single list, including for example: free items; paid items; low-cost items or items part of a paid-for subscription.

A user may prefer to choose from a list of results that reflect popular media content as per ranking of search results based on measurement criteria aside from number of views a media item received such as for example: number of times a media item has been linked to, mentioned or shared; veracity/authority of a media item (e.g. a news source that exudes characteristics such as trustworthiness, reputation, reliability, etc.); class or type of media content result (e.g. video, images, audio, news etc.), features included in the result (e.g. better picture resolution, bonus content, faster streaming, etc.) and other such criteria to better reflect the user's preference of search results. Accordingly, a single blended list can generate at least the following advantages: greater diversity of options displayed to users, increased range of vendors gaining exposure to users, superior user experience, and saving a user time when performing search queries.

Example System for Blending Ranked Search Results from Dissimilar Populations of Content into a Single Selection Referring now to the drawings, with reference initially to FIG. 1, blended ranking system 100 is illustrated that facilitates authorizing or restricting access to tagged segments of media content as a function of set permissions. Aspects of the systems, apparatuses or processes explained in this disclosure can constitute machine-executable component embodied within machine(s), e.g., embodied in one or more computer readable mediums (or media) associated with one or more machines. Such component, when executed by the one or more machines, e.g. computer(s), computing device(s), virtual machine(s), etc. can cause the machine(s) to perform the operations described. Blended ranking system 100 can include memory 102 for storing computer executable components and instructions. A processor 104 can facilitate operation of the computer executable components and instructions by the access control system 100.

In an embodiment, blended ranking system 100 employs an analysis component 110, a scoring component 120, a ranking component 130, and an ordering component 140. Analysis component 110 analyzes respective media content items 170 (e.g. audio content, video content, image content, . . . ) belonging to respective parent populations based at least in part on user browsing information. Scoring component 120 assigns a score to the respective media content items 170 based at least in part on a median value of a distribution of media content items 170 corresponding to the respective parent populations. Ranking component 130 ranks the respective media content items 170 based at least in part on the score. Ordering component 140 orders the respective media content items 170 based at least in part on the ranking.

The media content items 170 analyzed by analysis component 110 can include media data associated with one or more data sources (not shown) that can be accessed by blended ranking system 100 (and additional systems described in this disclosure). For example, a data source can include a data store storing media content and affiliated with a content provider that interacts with the blended ranking system 100. In another aspect, a data source can include a data store that stores media content remote from a content provider or a blended ranking system 100. In an aspect, media content items 170 can include media data as media items. For example, the media content items 170 can include one or more media items (e.g., video and/or audio including but not limited to movies, television, streaming television, video games, music tracks . . . ). In an aspect, the media content items 170 are at least one of a movie item, audio item, image item, or digital print item (e.g. newspaper, blog, on-line magazine, etc.). In another aspect, media content items 170 can include items which are not media-related such as downloadable and/or installable applications (e.g. mobile applications, tablet applications, desktop applications, etc.), or software applications.

In an aspect, a blended ranking system 100 (or additional systems described in this disclosure) can be configured to access the media content items 170 via a network such as for example the Internet, intranet, or cellular service. In another aspect, the blended ranking system 100 (or additional systems described in this disclosure) may be configured for use by a media rendering device. A media rendering device can include any suitable device associated with a user and configured to interact with or receive blended ranked results of media content items 170 (e.g. streaming video, audio downloads, etc.) from blended ranking system 100. For example, a media rendering device can include a desktop computer, a laptop computer, a smart phone, a media player, a portable electronic device, a tablet personal computer, or a personal digital assistant (PDA). As used in this disclosure, the terms "content consumer" or "user" refer to a person, entity, system, or combination thereof that employ blended ranking system 100 (or additional systems described in this disclosure).

In an embodiment, analysis component 110 can be configured to analyze respective media content items 170 belonging to respective parent populations based at least in part on user browsing information. A parent population is a set of media content items 170 wherein the media content items 170 share a similar property, value, measurement or feature. For instance, some audio music tracks are offered to users for free download and other audio music tracks are offered to users for purchase. Free audio music tracks may serve as one population of media content items 170 and audio music tracks for purchase may serve as another population of media content items 170. Furthermore, a population may be separated into subpopulations wherein larger populations may be further distinguished through properties, values, measurements, or features. In an aspect, a parent population can comprise media content items 170 belonging to more than one subpopulation.

For example, a population of free movies may include subpopulations of free comedy movies, free drama movies, free action movies, free suspense movies, and so on. Media content items 170 may belong to multiple populations or subpopulations due to diversity of features, values, aspects, types and characteristics of such media content items 170. A country music video for example can belong to a population of video content items or a population of music content items respectively. Accordingly, the country music video can also belong to a sub-population known as music videos which may be a part of a population of video content items and a population of music content items.

A population can include a group of media content items 170 that share similar features including, but not limited to, the following: whether a media content item 170 is offered for free or paid-for by a user, the type of media content item (video, audio, image), the media content item genre (e.g. action, drama, comedy, suspense, thriller, . . . ), the topic relating to the media content item (news, weather, sports, finance, . . . ), content consumer demographics, user search history, user preference, user rating, non-user rating, user popularity, number of views, frequency of views, frequency of downloads, or number of sources linking to the media content items. A user preference may include information relating to media content items 170 such as historical views, user context, user location, user queries, etc.

In an aspect, the user preference can be derived from any suitable number of traceable acts or data sources such as bookmarks, user queries, content published by user, user comments on content, user creation of content (e.g., uploading a video to a video distribution site), user created value-add content to existing content. Furthermore, popularity of media content items 170 can be assessed from media content sources, platforms and types that can indicate user popularity of media content items including, but not limited to; communication content technologies, published media content, problem processing content applications, news content, gossip content, research content, digital media content technologies, question-answer databases, digital video content, blogged content, podcast content, content forums, or review-website content.

In an aspect, blended ranking system 100 can employ analysis component 110 to analyze media content items 170 belonging to respective parent populations based at least in part on user browsing information. The user browsing information includes information related to an interactive search activity conducted by one or more users. In an aspect, browsing information can be information related to a search query. For instance, a user performing a search for tennis shoes may input the words "tennis" and "shoes" into a search engine in order to browse a set of search results, the words "tennis" and "shoes" may be browser information. Additionally, in an aspect, metadata, browser history data, download history, cache, passwords, saved form data, communication data, social networking data, e-mail data, published media content data, and other such user created content or data can be user browsing information.

In an aspect, analysis component 110 can analyze social network generated tags related to the respective media content items 170. A social network generated tag is an index to social network information such as a video, link, image, and other such information items. In an aspect, the analysis component 110 can make use of social network generated tags and social networking information from social constructs such as social networks. Users often interact with and participate in a social network which refers to a computer network that connects entities, such as people or organizations, by a set of social relationships, such as friendship, co-workers, college affiliates, etc. Also, in an aspect social networks can refer to a computer application or data connecting such entities by such social relationships. Analysis component 110 can make use of such social network information including social network generated tags to for purposes of aggregating and gathering a greater amount of relevant and popular media content items suitable to a particular user.

A social network can include an interconnection of two or more social circles and/or connections between two or more nodes. A social circle for a given user can be derived for example from the user's contact list, based upon other users with whom the user has exchanged email or text messages, or with whom the user is associated in a social network service. The interconnections of social networks can be based on one or more specific interdependency factors between users. Analysis component 110 can analyze interdependency factors to the respective media content items 170, whereby interdependency factors can be friendships, common interests, hobbies, career commonalities, kinship, financial exchange, likes, dislikes, romantic relationships, gender, sexual orientation, ethnicity, culture, religious beliefs, knowledge, demographics, geographic location or other such ties or associations between users. Collectively, social constructs that include one or more social circles and one or more social networks can facilitate the user sharing content with other users with a preference to consume particular content. In an aspect, analysis component 110 can analyze social circles, interdependency factors, and social network generated tags relating to media content items 170.

In an aspect, analysis component 110 can analyze social network generated tags that include for example social networking information such as user groups, user like's, user subscriptions, social network posts, number of viewings, number of click through of media content item 170 to determine popularity or likely user interest to share a segment of media content with a specific content consumer. Such information can be used to factor into the likelihood that a media content item 170 is popular or relevant to the user's search query.

In another aspect, analysis component 110 analyzes respective media content items 170 belonging to respective parent populations based at least in part on user browsing information. A parent population contains a variety of statistical information associated with the population such as the collection of media content items 170 that comprise the parent population, the organization of the data within the population, and the interpretation of such data. A parent population is comprised of a set of media content items 170 and associated data.

A search query can display search results chosen from one or more parent populations of media content items 170. In order to generate a blended array of media content items 170 results, each parent population is described by a normal distribution of data samples (e.g. data associated with individual media content items 170). In statistics, the standard deviation is a common measure of the distribution of data samples within a dataset (e.g. a set of data associated with a group of media content items 170) and the normal distribution is a significant probability distribution. A bell-shaped curve depicts probability density of one or more variables. In an instance, one standard deviation from the mean of a data set including data samples accounts for an identified percentage (e.g. 70%) of data values. The standard deviation characterizes degree of variation of a data sample from the mean (e.g. expected value of a variable).

Thus, in an aspect, analysis component 110 can analyze data samples related to respective parent populations that lie within one or more desired standard deviations of the mean of the respective parent populations. The analysis component 110 can further aggregate a group of data samples from various parent populations. For instance, a user may search for a 3-D action movie; accordingly, analysis component 110 can analyze action movies from parent populations such as free 3-D action movies, paid-for 3-D action movies, animated 3-D action movies, non-animated 3-D action movies, recent 3-D action movies, and older 3-D action movies. Each parent population can account for more than one variable, such that a population can comprise movies displayed in 3-D, such movies being released in the past 12 months, and such movie requiring user payment for viewing.

Furthermore, in an aspect, analysis component 110 can analyze statistics associated with parent populations and sub-populations. The statistics may pertain to specific features of media content items 170. For example, analysis component 110 may analyze statistics for each variable or feature that characterizes the distribution of particular media content items 170 across one or more populations of media content items 170. The set of statistics analyzed may be based on, for example, the mean, the median, the standard deviation, the quartiles, the sum, and other statistical metrics. The statistical metrics analyzed can also include statistics, such as the median value of a distribution of scored media content items, relating to a derived score that is associated with media content items 170.

In an embodiment, a scoring component 120 assigns a score to the respective media content items 170 based at least in part on a median value of a distribution of media content items 170 corresponding to the respective parent populations. In an aspect, the score for each individual media item is normalized using the median value for the respective parent population. As later described, a set of statistics relating to parent populations of media content items 170 can be generated. The statistics, such as a median value or a normalization curve related to media content items of a respective parent population, can factor into the scoring of media content items 170 to support the likelihood a media content item 170 is related to the user search query.

In an aspect, scoring component 120 can perform the action of receiving analyzed data samples or other such analyzed information relating to media content items 170 and assign a score to the media content items 170. The assigned score can be based on any one or more scoring formulas that describe the quality, relevance, or other such scoring criteria of media content items 170 in relation to the user search query. In an aspect, the scoring can be based on any number of search result sets. Each search result set can be based on a separate variable.

For instance, each search set can be based on each respective term in the search query. In an aspect, for example, a user query for a "yoga meditation video" can generate three sets of search results; a result for "yoga", a result for "meditation" and a result for "video" (also more than three sets of search results can be created, for instance, "meditation video" search result set or "yoga video" search result set, however, three sets are identified for purposes of the example). Accordingly, each set of search results can be scored based on the quality and relevance to the search query term. Thus results for "yoga" can generate a list of yoga items such as vinyasa yoga, breathing yoga, hot yoga, bikram yoga, ashtanga yoga, meditation yoga and other such yoga items. Scoring component 120 can assign a score to each item, such that a higher score is associated with a higher quality media item. Thus meditation yoga may receive a higher score than ashtanga yoga and a meditation yoga video item may receive a higher score than a meditation yoga tutorial or blog item.

The search result score of the first set of media content items 170 can be based on a first scoring criteria. The search result score of the second set of media content items 170 can be based on a second scoring criteria that is the same or different from the first scoring criteria. The scores of the first set, second set, and N sets of media content items 170, wherein N is an integer, can be aggregated and standardized according to a scoring formula or scoring algorithm in order to generate a single list of media content items 170 for purposes of ranking based on quality, relevance, blending variables, and other such criteria associated with the search results.

In an embodiment, a ranking component 130 ranks the respective media content items 170 based at least in part on the score. In an aspect, the single list of media content items 170 with associated scores assigned to each media content items 170 can be ranked according to various ranking factors. In an aspect, the ranking component 130 can be configured to rank a list of media content items 170 based at least in part on the score generated as per relevance, quality or other scored criteria related to the media content items 170. In an aspect, the ranking can be based on a score that accounts for user interest in a media content item 170. The user interest can be based on (e.g. via inference) browser information (e.g. meta-data, browser history data, download history, cache, passwords, saved form data, communication data, social networking data, e-mail data, published media content data, etc.). In another aspect, ranking component 130 can rank the media content items based at least in part on one or more of critical rating (a rating generated by a computer, user, or group of users associated with a media content item), number of critical reviews (the aggregate quantity of reviews associated with a media content item), recency (the date a media content item was introduced on the internet), user interest, user preference, user traffic, popularity, or user demographics. The ranking component 130 can apply a priority scheme relating to relevance, quality, user interest or another score criteria associated with media content items 170.

For example, for media content items 170, the ranking component 130 can rank a user's interest in one media content item 170 as higher than another media content item 170. In another aspect, the ranking component 130 can rank a user interest in a scored media content items 170 belonging to a respective population against one or more media content items 170 from a different population of media content items 170. For example, the ranking component 130 can rank a first set of scored media content items 170 of a population higher or lower than a second set of scored media content items 170 of a second population.

In yet another aspect, rankings can be multi-tiered. For example, in an aspect, a set of media content items 170 can be ranked against other sets of media content items 170 as well as against segments of a third set of media content items 170 based on various ranking criteria, such as quantity of viewing traffic of a set of media content items 170. In an aspect, ranking component 120 can rank sets of scored media content items 170, for example, based at least in part on a set of users, a subset of users, user preference, user historical preferences, user feedback, number of views, number of references, etc. In another aspect, the ranked sets of media content items 170 can be ranked in an order.

In an embodiment, an ordering component 140 can order the respective media content items 170 based at least in part on the ranking. In an aspect, the media content items 170 (e.g. those media content items that are analyzed, scored, ranked or any combination of analyzed, scored, and ranked) can be listed in an order that organizes a set of search results into a list. The position of each respective media content items 170 in the list order can be based on the analysis, score, rank or combination of analysis, score, and rank. For instance, in an aspect, ordering component 140 can order the respective media content items 170 based on a classification of the ranking. The ordering component 140 can order the ranked media content 170 according to a classification, genre or category. Similarly, ordering component 140 can order analyzed media content items 170 or scored media content items 170 as a function of class, genre, or category. In an aspect, the ordering component 140 may use a predetermined labeled class, genre, bucket, or category to associate a class, genre, or category with a media content item 170.

For example, in an aspect, ordering component 140 may order the media content items 170 into a genre by associating a title, words from the title, or other meta-data words associated with a particular genre (i.e. action videos, country music audio items, etc.). The extracted words or identifiers may be associated with a class, genre, or category within a predetermined label. Further, ordering component 140 can retrieve the associated class, genre, or category from the predetermined label by using extracted identifiers. As an example, any movie title with the words "ball," "hoop," and "shoot" in the title are ordered into a movie category labeled "sport movies" wherein such movie's with ball, hoop and shoot in the title may be retrieved as a search result from such ordered list.

In an aspect, ordering component 140 can order media content items 170 based on external information such as users social network labels (e.g. predetermined classifications labels). For example, ordering component 140 can order media content items 170 based on text analysis (e.g. via analysis component 110) to determine classification labels to associate with user nodes in a generated social graph. Analysis component 110 in connection with ordering component 140 can analyze and order media content associated with user profiles, comments posted by a user (e.g. comments on a video posted to user social network account), descriptions of groups to which a user belongs, etc. In an aspect, ordering component 140 can order media content items 170 into predetermined classification labels based on keywords, which can be submitted by advertisers.

For example, the keywords can include the term "travel." The term can be used as a predetermined classification label, which ordering component 140 associates with users that have media content that include the term "travel." Additionally, ordering component 140 can order media content items 170 based on the similarity of an ordering factor (e.g. a keyword term) to other media content items 170 within a predetermined label. For instance, ordering component 140 can order media content items 170 within a category labeled "sports" media content in user profiles to include media content items 170 that possess features (e.g. a term in the title of the media content item, graphics associated with the media content item, authors associated with the media content item, etc.) associated with "sports," such as terms in the title of a media content item that demonstrate sports characteristics such as ball, goal, jump or score.

Ordering component 140 can order media content items 170 in a dynamic manner to accommodate requests from a user or user search query modifications. The user modifications can be used by ordering component 140 to re-sort, filter or classify the media content items 170 within a new ordering scheme. For example, a search result not previously presented to a user may be later ordered and presented to the user based on a user interaction with a specific media content items 170 such as a user voting scheme (e.g. popularity of a media content items 170, favorite media content items 170, user commenting, etc.). The ordering component 140 may factor into the ordering whether or not a user has interacted (e.g. viewed a video) with a media content item 140 and also determine the frequency or proximity in time of such interaction when determining the ordering of media content items 170.

In another aspect, ordering component 140 can remove search results based on a user modification of a search. For example, ordering component 140 can remove a category from the ordering hierarchy based on user information such as the addition of a new search term or an inference that the user is interested in a different category of media content items 170. The ordering component 140 can also expand or further refine the search results by adding new categories identified as more closely related to the user's desired media content items 170.

As an example, if a user conducts a search query on a specific device, such as a mobile device, ordering component 140 may re-order the search results to include media content items 170 specifically suited or formatted for use with the mobile device. Regardless of whether a score or rank is associated with a media content item 170, a lower scoring media content item 170 that is adapted to a format suitable for the mobile device may be ordered higher than a higher scoring media content item 170 due to the formatting similarities of the media content item 170 and the mobile device. For example, a video result that is formatted for display on a mobile device but is not as closely associated with the search query terms input by a user may be ordered higher than a video result not formatted for display on a mobile device yet closely aligns with the search query terms input by the user.

The ordering component 140 can also remove duplicate media content items 170 from the ordered list. Duplicates of media content items 170 may arise wherein a media content item 170 belongs to more than one population or in an instance wherein the same media content item 170 is relevant to multiple terms in a search query or in more than one feature (e.g. a video that is presented in hi-definition and contains premium paid-for content that is relevant as a video item and as a paid-for item). When removing a duplicate media content item 170, the removed duplicate media content item will be re-ordered by ordering component 140 to occupy the higher ranked position of the media content item 170 that remains in the ordered list.

In an aspect, the ordering component 140 lists individual media content items 170 belonging to the respective parent populations into a single list based at least on the ranking. Furthermore, the ordering component 140 can further list a blend of the media content items 170 belonging to the respective parent populations with dissimilar distributions based at least on the median value of the respective parent populations. Ordering component 140 can factor into the ordering any such relevant information including generated statistics such as a standard deviation, mean, median, normal distribution, and other such statistics. Accordingly, ordering component 140 can work in connection with any one or more of the analysis component 110, the scoring component 120, the ranking component 130, or the statistical component 210 (which will be described in this disclosure).

In some aspects, each of the analysis component 110, scoring component 120, ranking component 130, and ordering component 140 may work in connection with one another and in no specific chronology. For instance, ordering component 140 in connection with rank component 130 may also rank ordered media content items 170 based on any one or more factors such as user interest. For instance, ordering component 140 may order a set of media content items 170 and ranking component 130 can rank the media content items 170 within the ordered set based at least in part on user interest (e.g. as determined from user browsing information) in the media content items 170. In an aspect, ordering component 140 may order, as a function of rank component 130, ordered sets of media content items 170 based at least in part on user interest and can apply a priority scheme relating to user recommended media content items 170. For example, for a media content item 170, the ordering component 140 can order and the rank component 130 can rank a user's interest in a set of media content items 170 wherein one media content item 170 within an ordered set of media content items 170 is ranked higher than another media content item 170 within the same ordered set of media content items 170.

In another aspect, ordering component 140 in connection with scoring component 120 may also assign a score to the ordered media content items 170 based on any one or more factors such as a median value of a distribution of media content items corresponding to the respective parent populations. For instance, ordering component 140 may order a set of media content items 170 and scoring component 120 can score the media content items 170 within the ordered set based at least in part on a median value as determined by a statistical distribution of the ordered media content items 170. In an aspect, ordering component 140 may order as a function of scoring component 120 scored sets of media content items 170 based at least in part on a median value of a distribution of the scored media content items 170. For example, for a media content item 170, the ordering component 140 can order and the scoring component 120 can score a set of media content items 170 wherein one media content item 170 within an ordered set of media content items 170 is scored higher than another media content item 170 within the same ordered set of media content items 170.

In another instance, ranking component 130 in connection with scoring component 120 may also assign a score to the ranked media content items 170 based on any one or more factors such as a median value of a distribution of media content items 170 corresponding to the respective parent populations. For instance, ranking component 130 may rank media content items 170 within a set and scoring component 120 can score the media content items 170 within the ranked set based at least in part on a median value as determined by a statistical distribution of the ordered media content items 170. In an aspect, ranking component 130 may rank as a function of scoring component 120 scored sets of media content items 170 based at least in part on a median value of a distribution of the scored media content items 170. For example, for a media content item 170, the ranking component 130 can rank and the scoring component 120 can score a set of media content items 170 wherein one media content item 170 within a ranked set of media content items 170 is scored higher than another media content item 170 within the same ordered set of media content items 170.

In another aspect, analysis component 110 in connection with ranking component 130 may also rank respective media content items 170 based at least in part on the respective analyzed media content items 170. For instance, analysis component 110 may analyze media content items 170 within a set and ranking component 130 can rank the media content items 170 within the analyzed set of media content items 170 based at least in part on user browsing information. In another aspect, ranking component 130 may rank media content items 170 as a function of analysis component 110 analyzed sets of media content items 170. For example, for a media content item 170, the analysis component 120 can analyze and the ranking component 130 can rank a set of media content items 170 wherein one media content item 170 within an analyzed set of media content items 170 is ranked higher than another media content item 170 within the same analyzed set of media content items 170.

Figure 2:
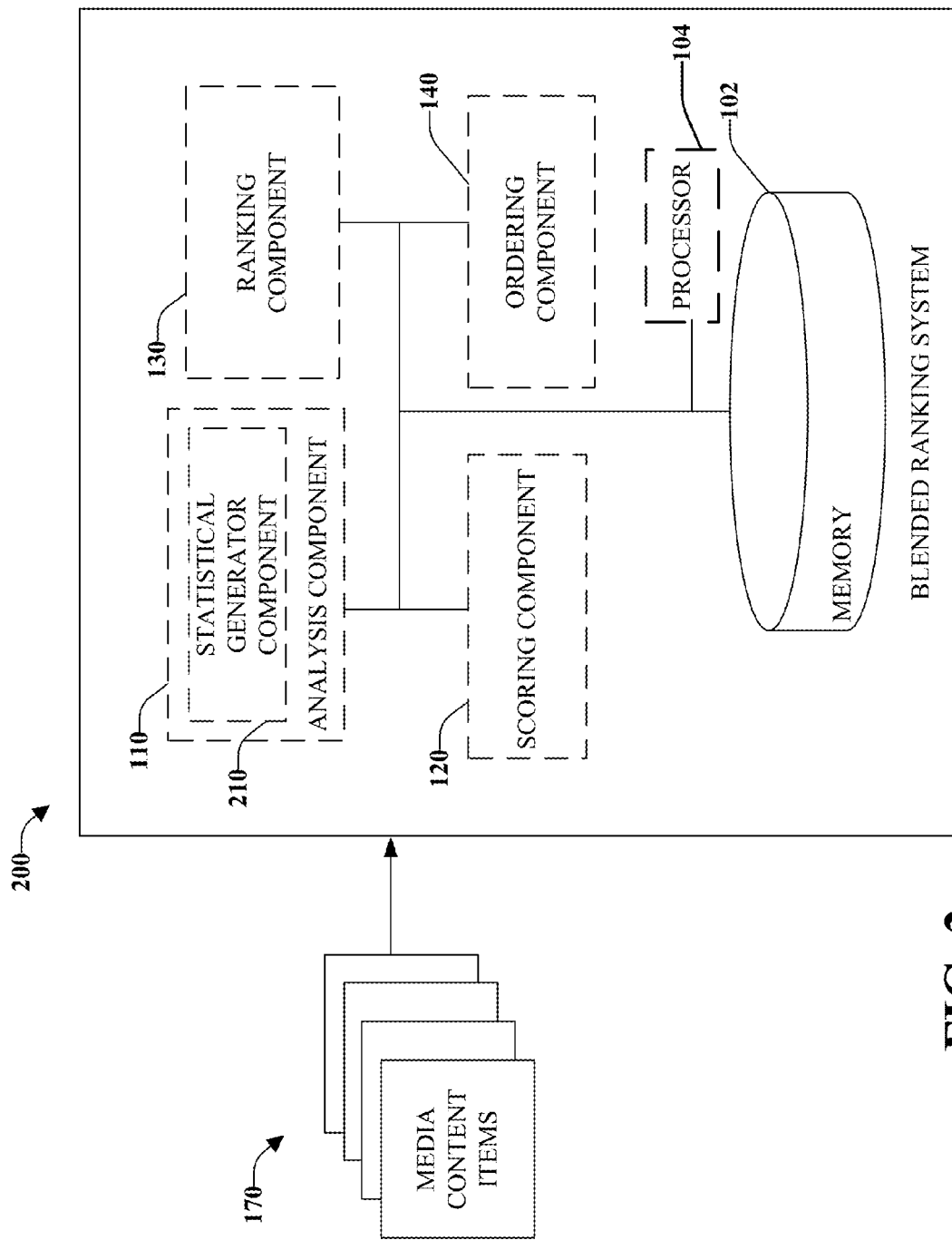
FIG. 2 illustrates an example non-limiting blended ranking system for generating statistics associated with media content items.

Turning now to FIG. 2, presented is another non-limiting embodiment of blended ranking system 200 in accordance with the subject of the disclosure. In an aspect, system 200 facilitates generating statistics associated with media content items 170. In an aspect, analysis component 110 employs a statistical generator component 210 that generates statistics associated with media content items 170 corresponding to a respective parent population. Statistical generator component 210 generates statistics that indicate information regarding the media content items 170 to facilitate identification of those media content items 170 that are most relevant to a search query. For instance, statistics generator component 210 can generate statistics based on the mean, the median, the standard deviation, the quartiles, the sum and other statistical metrics related to media content items 170 corresponding to a respective parent population. Analysis component 110 in connection with statistical generator component 210 can generate statistics associated to media content items 170 of a respective parent population and analyze the statistics to determine relevance, quality and other information measures of the media content items 170 as related to a user search query.

In an aspect, statistical generator component 210 can generate a normal distribution of media content items 170 within a parent population. Furthermore, a standard distribution of the media content items 170 can be generated. A large standard deviation indicates that the media content items 170 are far from the mean and a small standard deviation indicates that the media content items 170 within that standard deviation are clustered closely around the mean. In general, the more media content items 170 that are sampled by statistical generator 210 in generating statistics, the greater likelihood a small standard deviation will be obtained and therefore a more reliable estimate of the mean of a random variable or feature analyzed.

In an aspect, for example, the distribution of media content items 170 that are comedy videos can be approximated by a normal distribution. To estimate the probability of a search query that includes the terms "romantic comedy" may require a search of thousands of media content items 170 until a predetermined number of queries including the term romantic comedy are found. Statistical generator 210 can generate a normal distribution of comedy videos and determine a standard deviation of specific video's that are romantic comedies. Those romantic comedies that lie within a standard deviation closer to the mean are likely to be a more reliable estimate of a video the user desires to view.

Additionally, in an aspect, statistical generator 210 can generate statistics based on various populations and analysis component 110 can analyze such results for purposes of procuring blended search results. Thus, statistical generator 210 can generate a normal distribution and standard deviation statistics for romantic comedies within a population of comedies that users can view for free and generate the statistics for romantic comedies within a population of comedies that users can view for a fee. The generation of statistics over many populations allows for a greater variety and range of search results therefore enhancing a user's search experience.

In an aspect, blended ranking system 200 can make use of algorithms in connection with any one or more of statistical generator component 210, analysis component 110, scoring component 120, ranking component 130 or ordering component 140 to facilitate a blended ranking of dissimilar populations. In an instance, an algorithm can blend and rank dissimilar populations of free media content items and paid-for media content items for display to a user in a search result list. For example, an algorithm can first make use of count data (e.g. via analysis component 110) whereby view count lists for free media content populations and paid-for media content populations are obtained:

$f_{count}$=Free item popularity count list $p_{count}$=Paid item popularity count list=Paid item purchase count list The popularity count data can be grouped (e.g. via ordering component 140) into various buckets sorted by powers of ten (e.g. 0-10, 10-100, 100-1000, etc.):

$f_i = \{x\} \forall x \in f_{count} | 10^{i-1} < x < 10^i$ $p_i = \{x\} \forall x \in p_{count} | 10^{i-1} < x < 10^i$ The counts for each group of free count data and paid-for count data can be $C_{f_i}$ and $C_{p_i}$ respectively. For each population, the bucket with the maximum count (C) value is identified:

Let $A_{diff}$=$GM_f$-$GM_p$, where $GM_f$ and $GM_p$ are respective geometric means of the most common bucket.

The maximum count bucket for each population is the most common bucket for the view count distribution. The data for both free and paid-for populations generally follows a normal distribution. In order to compare dissimilar populations, a geometric mean (GM) of each population can be generated (e.g. via statistics generator component 210) and normalized according to the GM. In order to avoid the influence of a tail on the normalized values, a geometric mean (GM) is generated around mean (which is obtained by grouping values into buckets) and the most common bucket's data is used to compute the GM's.

After the GM's are computed, the offset for free item boosts and paid-for item boosts can be calculated:

$F_b$=0 if $A_{diff}$>0 else $A_{diff}$ $P_b$=$A_{diff}$ if $A_{diff}$>0 else 0

Further, the ranking score can be calculated for an individual free item or paid-for item respectively using the offset calculations in previous steps (e.g. normalization of each individual item, relative to its parent population):

$Sx_f = \log(x_f) F_b$ where $x_f \in f_{count}$ $Sx_p = \log(x_p) P_b$ where $x_p \in p_{count}$ In an aspect, blended ranking system 200 can make use of other such algorithms to achieve result lists that consist of more than a heterogeneous mix of more than one population (e.g. free media content populations and paid-for media content populations) of media content items.

Figure 3:
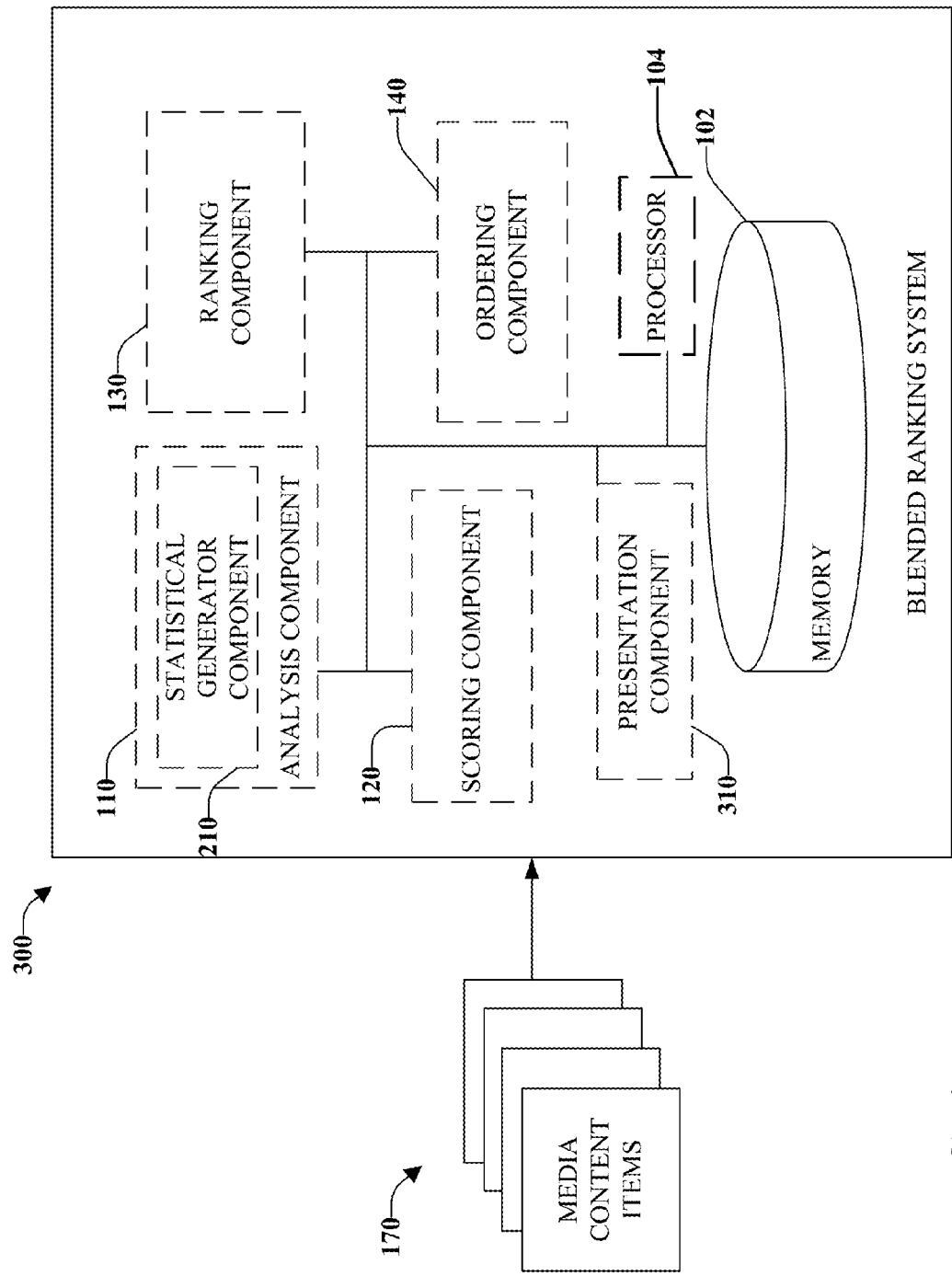
FIG. 3 illustrates an example non-limiting blended ranking system for generating a display of the ordered media content items.

Turning now to FIG. 3, presented is another non-limiting embodiment of blended ranking system 300 in accordance with the subject of the disclosure. In an aspect, system 300 facilitates generating a display of the ordered media content items 170. In an aspect, a presentation component 310 generates a display of the ordered media content items 170. In an aspect, a user can view search results of media content items 170 that are analyzed, scored, ranked, or ordered. The search results may consist of a blended search of media items 170 from one or more parent populations seamlessly integrated into one search result. In an aspect, presentation component 310 can work in connection with ordering component 140 wherein ordered media content items 170 are presented to users. In another aspect, presentation component 310 can work in connection with ranking component 130 wherein ranked media content items 170 are presented to users. Furthermore, presentation component 310 can work in connection with scoring component 120 wherein scored media content items 170 are presented to users.

The presentation of search results can be displayed in formats in which some media content items 170 are recommended and other media content items 170 are not recommended. In an aspect, presentation component 310 can generate a display wherein a user moves a curser over any of the search results and further detailed information regarding the media content item 170 is displayed to the user. Further, if the user removes the curser from the media content item 170 the further detailed information disappears. Further information regarding a media item, for example; a video, can include the length of the video, the quality of the video, the rating of the video, the characters in the video, the number of views, a brief description of the content of the video and other such information that a user may find useful in determining whether to consume a media content item 170.

Additionally, the presentation component 310 can present search results of various formats to facilitate use of media content items 170 with any suitable type of device that receives media files, for example; a mobile phone, tablet computer, desktop computer, server system, personal computers, cable set top box, satellite set top box, cable modem, television set, internet-enabled televisions, television computer device media extender device, video cassette recorder device, Blu-ray device, DVD (digital versatile disc or digital video disc) device, compact disc device, video game system, audio/video receiver, radio device, portable music player, navigation system, car stereo, or other such devices.

Respective devices often have different capabilities and limitations (e.g., screen size, decoders . . . ). In an aspect, the presentation component 310 can provide presentation options in accordance with different device capabilities or limitations. For example, data rendering capabilities may be more limited in a mobile device (e.g., a smart-phone) than in a fixed computing device (e.g., a desktop computer), more effort may be required of a user to consume content such as a video (or other information) from the mobile device than would be required of the user in viewing the same video from a fixed computing device. In addition, because displays of various mobile devices are often smaller than displays in fixed computing devices, it may be possible only to display a relatively small amount of information at any given time on a mobile device. Thus, presentation component 310 can optimize display options and content for respective devices. Finally, data connections between a mobile device and various networked resources (e.g., the internet) may be slower than corresponding data connections between a fixed computing device and the same networked resources. Accordingly, presentation component 310 can generate user options to account for variations in device functionality and available bandwidth for consumption and rendering of media content.

In view of the above, in an aspect, the presentation component 310 can present content in various formats and/or in accordance with various display mediums. For example, in one embodiment, the presentation component can present a section of video in a format such as H.263, H.264 AVC, MPEG-4 SP, VP8, or other suitable format. In another embodiment the presentation component 310 may present an audio section in formats such as for example AAC LC/LTP, HE-AACv1(AAC+), HE-AACv2 (enhanced AAC+), AMR-NB, AMR-WB, FLAC, MP3, MP4, MIDI, Vorbis, PCM/WAVE, etc.

In an aspect, the presentation component 310 can automatically configure or present user options to consume media content items 170, such as video or audio content, based on encoding parameters such as video resolution, video frame rate, video bit rate, video codec, audio codec, audio channels, audio bit rate, etc. Thus the presentation component 310 or a user may choose a format to consume content that best suits capabilities of specific consumption mediums, available bandwidth, file size, processing capabilities, screen resolution, screen size, available encoders, available decoders, or other such mediums.

Figure 4:
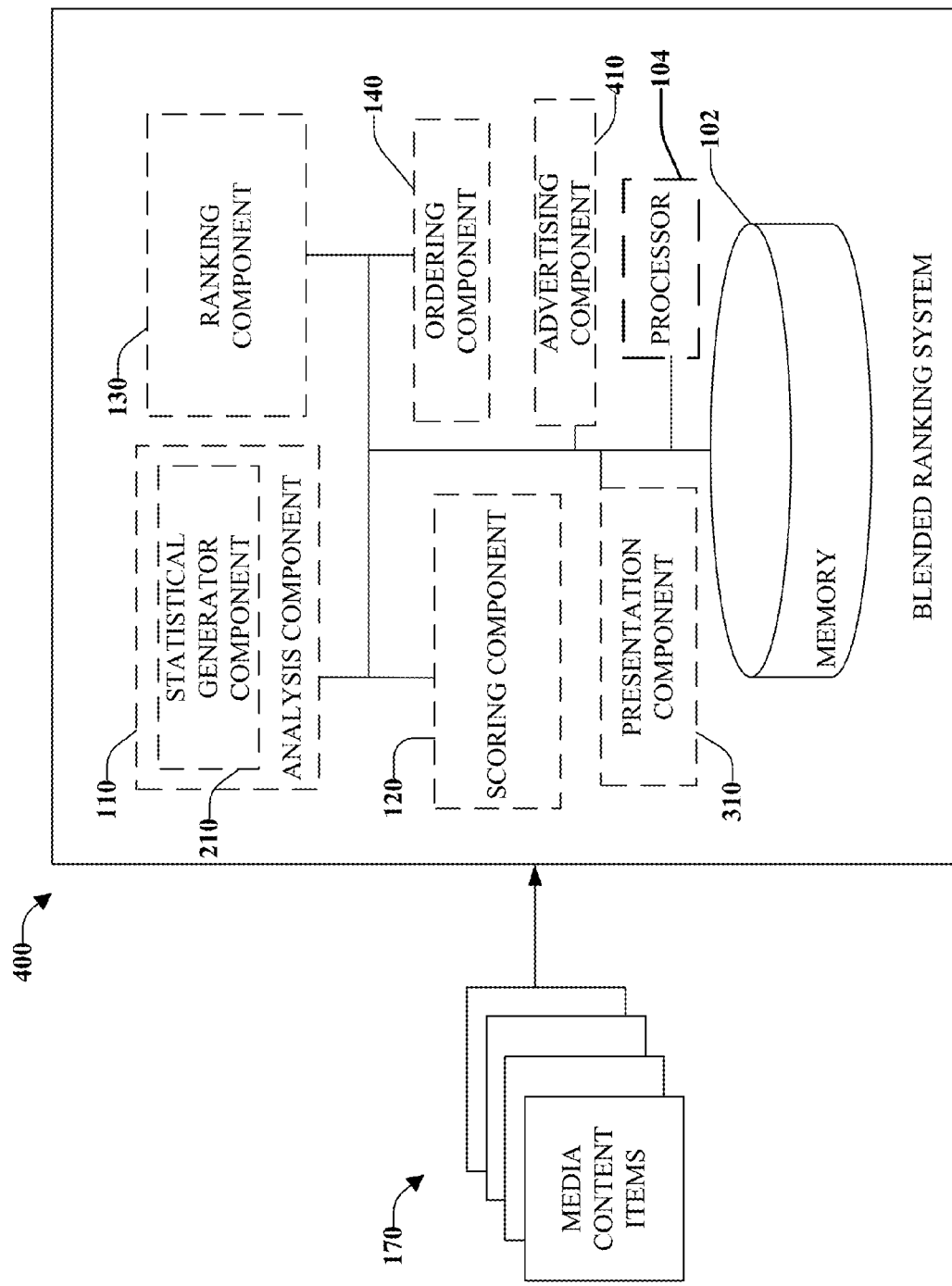
FIG. 4 illustrates an example non-limiting blended ranking system for applying advertisements to a section of the search result list.

Turning now to FIG. 4, presented is another non-limiting embodiment of blended ranking system 400 in accordance with the subject of the disclosure. In an aspect, system 400 facilitates applying an advertisement to a section of the search result list. In an aspect, an advertisement component 410 applies an advertisement to a section of the search result list. In various aspects, a search result list can become a method by which advertisers gain the attention of users whom are also potential consumers of the advertised product or service. The advertisements can take many forms including, but not limited to, banner advertisements, text only advertisements, image advertisements, audio advertisements, video advertisements, or advertisements combining one or more of such advertisements.

In an aspect, the advertisement component 410 applies an advertisement to a section of the search result list based at least in part on similarity between the generated search result list of media content items 170 and a product or service associated with the advertisement. In another aspect, the advertising component 410 can apply an advertisement to a section of the search result list based at least in part on demographics of users that likely consume the particular type of media content items 170. In various aspects, the advertising component 410 can apply an advertisement to a section of the search result list based on one or more of browser information, user purchasing history, user navigation history, social interests, user preferences, user relevance, media content genre, target user, or pre-defined criteria.

FIGS. 5-10 illustrates a methodology or flow diagram in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Figure 5:
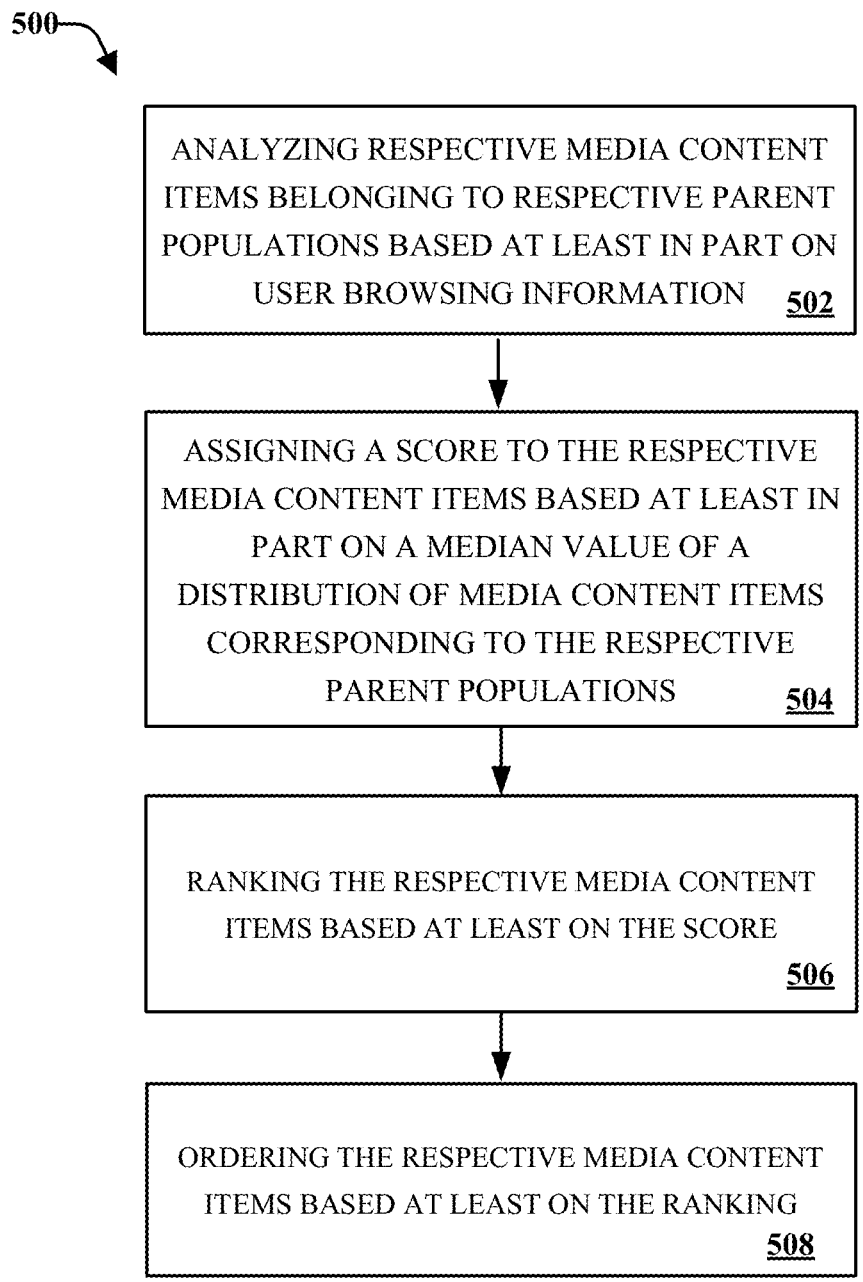
FIG. 5 illustrates an example methodology for analyzing, scoring, ranking, and ordering media content items in accordance with one or more implementations.

Referring now to FIG. 5, presented is a flow diagram of an example application of blended ranking systems disclosed in this description accordance with an embodiment. In an aspect, exemplary methodology 500 of a blended ranking system is stored in a memory and utilizes a processor to execute computer executable instructions to perform functions. At 502, blended ranking system analyzes (e.g. using an analysis component 110) respective media content items belonging to respective parent populations based at least in part on user browsing information. The analysis can be based on social network generated tags related to the respective media content items. At 504, the media content items are assigned a score (e.g. using scoring component 120) based at least in part on a median value of a distribution of media content items corresponding to the respective parent populations. The score for each individual media item can be normalized using the median value for the respective parent population. At 506, the media content items are ranked (e.g. using ranking component 130) based at least in part on the score. The rank can be based at least in part on any one or more of critical rating, number of critical reviews, recency, user interest, user preference, user traffic, popularity, or user demographics. At 508, the media content items are ordered (e.g. using ordering component 140) based at least on the ranking. The ordering can comprise a list of individual media content items belonging to the respective parent populations consolidated into a single list based at least on the ranking.

Figure 6:
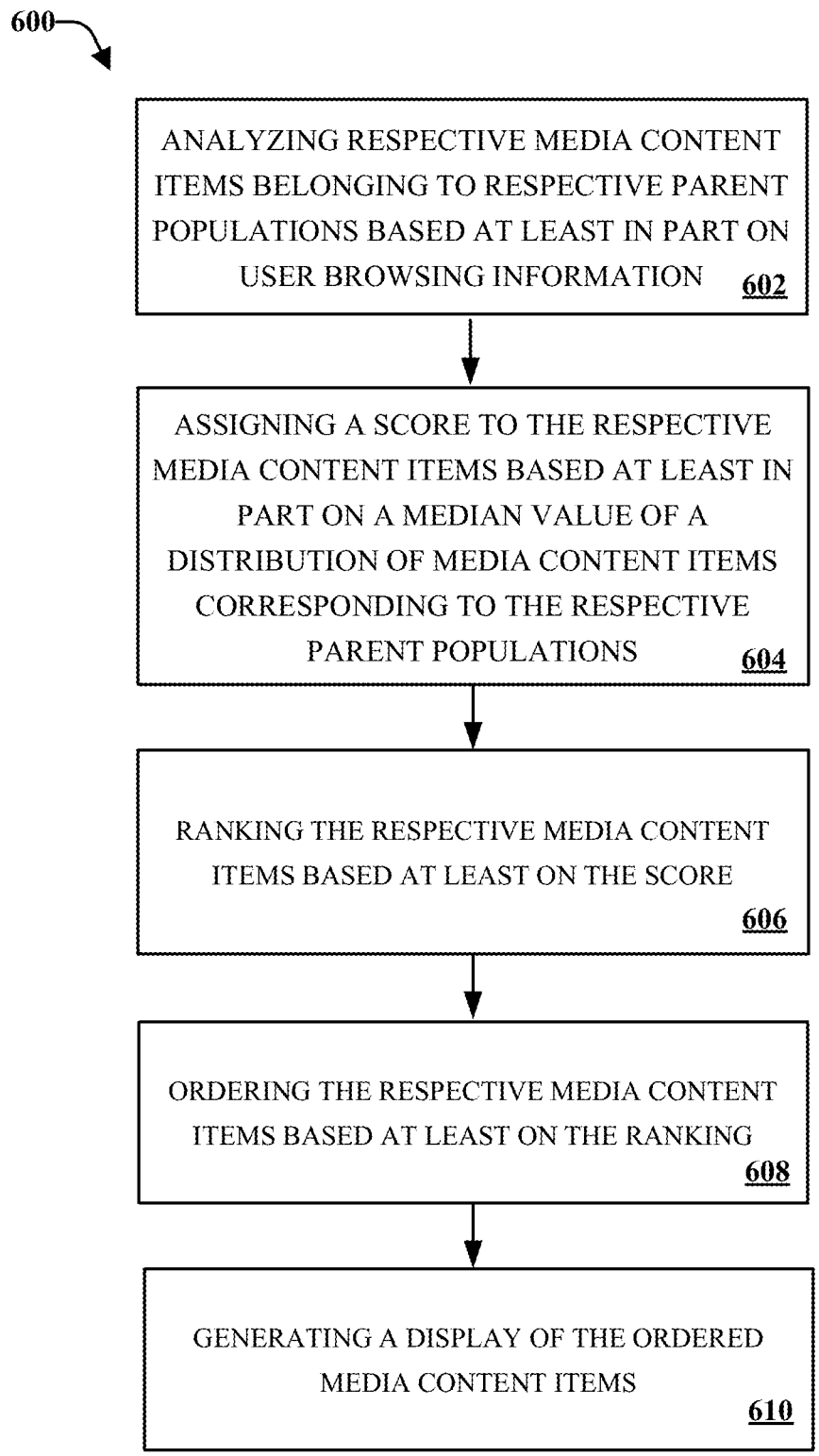
FIG. 6 illustrates an example methodology for analyzing, scoring, ranking, ordering, and displaying media content items in accordance with one or more implementations.

Referring now to FIG. 6, presented is a flow diagram of an example application of blended ranking systems disclosed in this description accordance with an embodiment. In an aspect, exemplary methodology 600 of a blended ranking system is stored in a memory and utilizes a processor to execute computer executable instructions to perform functions. At 602, blended ranking system analyzes (e.g. using an analysis component 110) respective media content items belonging to respective parent populations based at least in part on user browsing information. The analysis can be based on social network generated tags related to the respective media content items. At 604, the media content items are assigned a score (e.g. using scoring component 120) based at least in part on a median value of a distribution of media content items corresponding to the respective parent populations.

The score for each individual media item can be normalized using the median value for the respective parent population. At 606, the media content items are ranked (e.g. using ranking component 130) based at least in part on the score. The rank can be based at least in part on any one or more of critical rating, number of critical reviews, recency, user interest, user preference, user traffic, popularity, or user demographics. At 608, the media content items are ordered (e.g. using ordering component 140) based at least on the ranking. The ordering can comprise a blend of the media content items belonging to the respective parent populations with dissimilar distributions based at least on the median value of the respective parent populations. At 610, a display of the ordered media content items 170 are generated (e.g. using presentation component 310).

Figure 7:
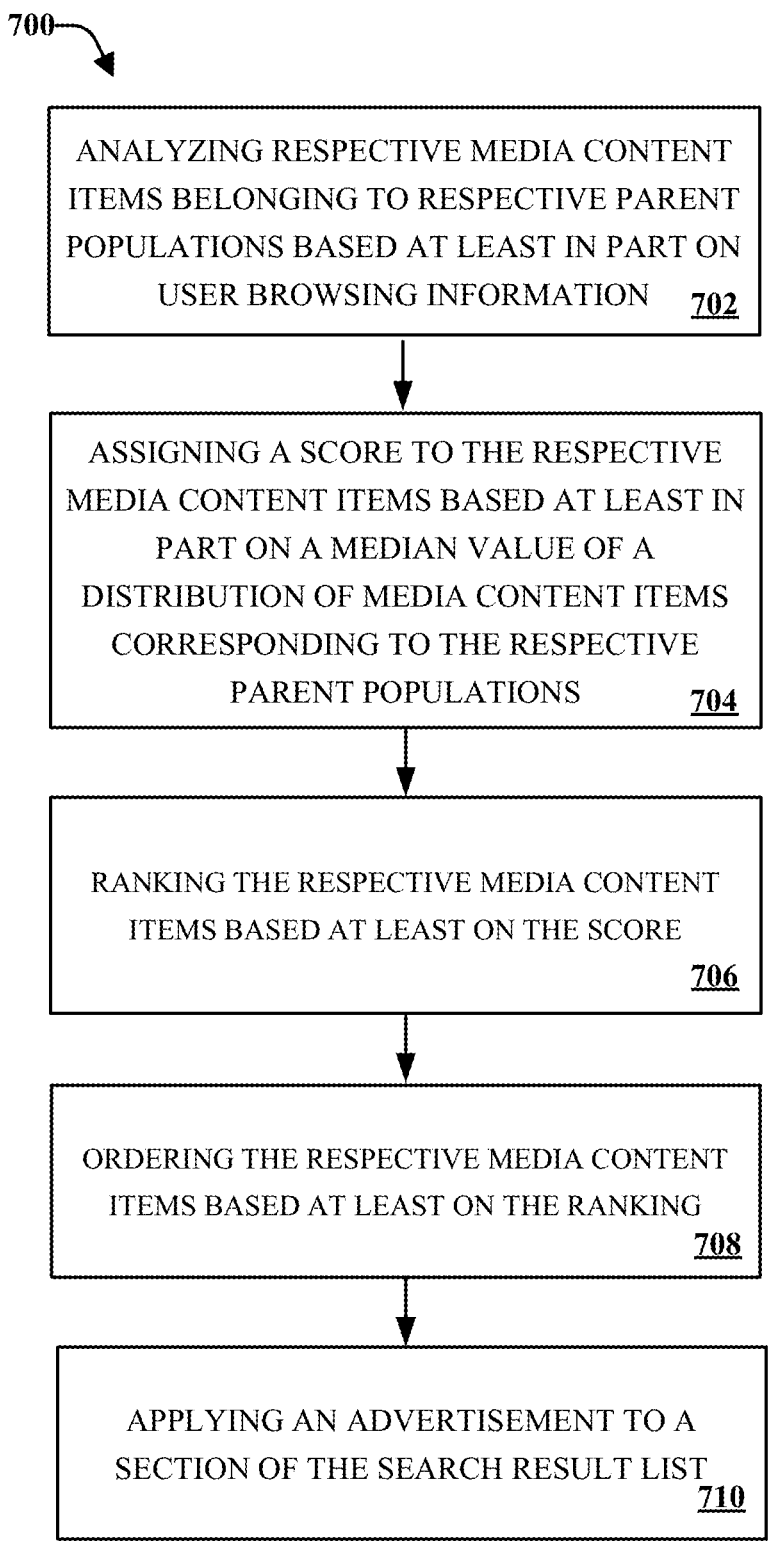
FIG. 7 illustrates an example methodology for analyzing, scoring, ranking, ordering, and applying an advertisement to media content items in accordance with one or more implementations.

Referring now to FIG. 7, presented is a flow diagram of an example application of blended ranking systems disclosed in this description accordance with an embodiment. In an aspect, exemplary methodology 700 of a blended ranking system is stored in a memory and utilizes a processor to execute computer executable instructions to perform functions. At 702, blended ranking system analyzes (e.g. using an analysis component 110) respective media content items belonging to respective parent populations based at least in part on user browsing information. The analysis can be based on social network generated tags related to the respective media content items. At 704, the media content items are assigned a score (e.g. using scoring component 120) based at least in part on a median value of a distribution of media content items corresponding to the respective parent populations. The score for each individual media item can be normalized using the median value for the respective parent population.

At 706, the media content items are ranked (e.g. using ranking component 130) based at least in part on the score. The rank can be based at least in part on any one or more of critical rating, number of critical reviews, recency, user interest, user preference, user traffic, popularity, or user demographics. At 708, the media content items are ordered (e.g. using ordering component 140) based at least on the ranking. The ordering can comprise a list of individual media content items belonging to the respective parent populations consolidated into a single list based at least on the ranking At 710, advertisements are applied to a section of the media content items list (e.g. using presentation component 310).

Figure 8:
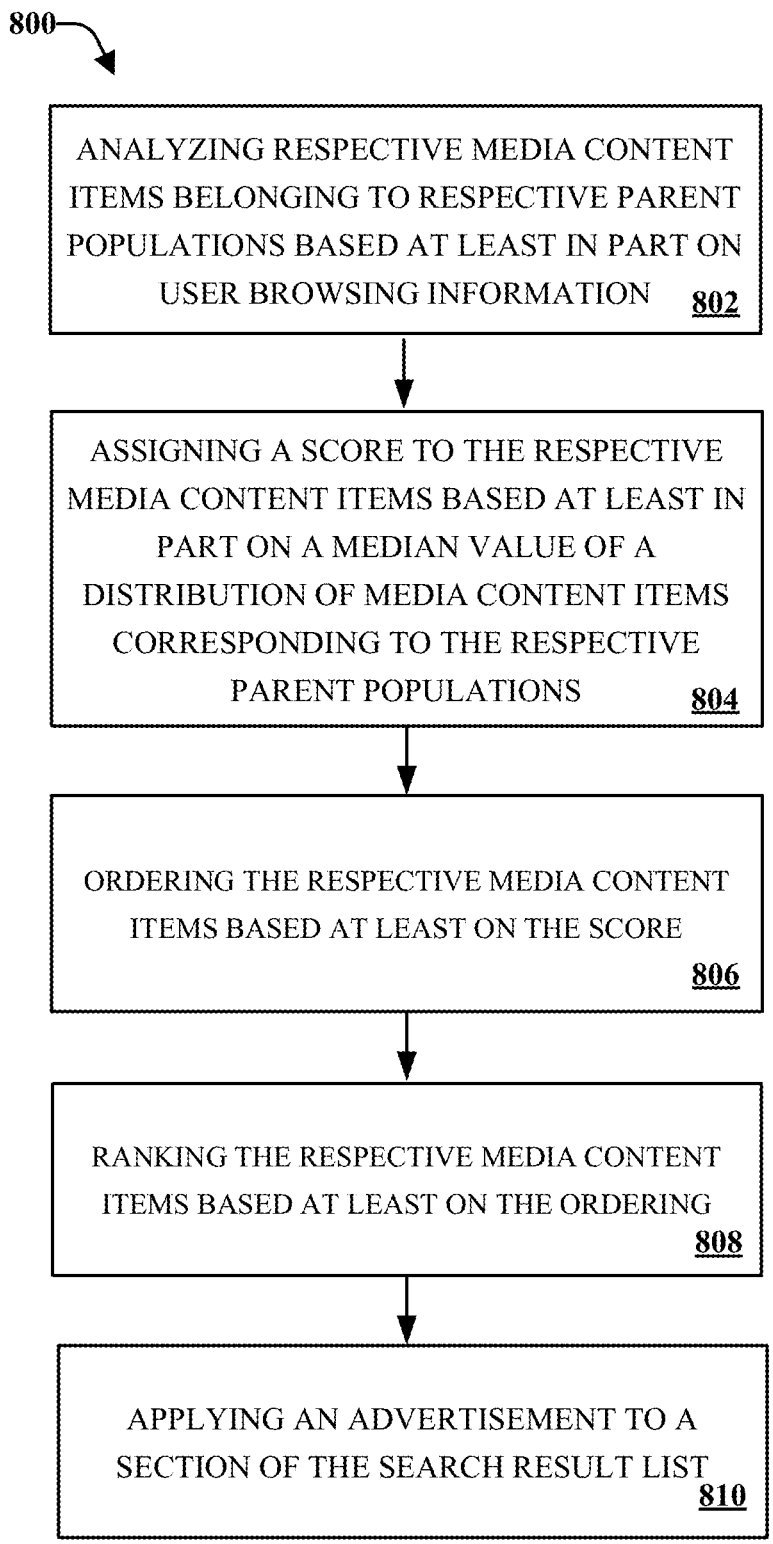
FIG. 8 illustrates an example methodology for analyzing, scoring, ordering, ranking and applying an advertisement to media content items in accordance with one or more implementations.

Referring now to FIG. 8, presented is a flow diagram of an example application of blended ranking systems disclosed in this description accordance with an embodiment. In an aspect, exemplary methodology 800 of a blended ranking system is stored in a memory and utilizes a processor to execute computer executable instructions to perform functions. At 802, blended ranking system analyzes (e.g. using an analysis component 110) respective media content items belonging to respective parent populations based at least in part on user browsing information. The analysis can be based on social network generated tags related to the respective media content items. At 804, the media content items are assigned a score (e.g. using scoring component 120) based at least in part on a median value of a distribution of media content items corresponding to the respective parent populations. The score for each individual media item can be normalized using the median value for the respective parent population.

At 806, the media content items are ordered (e.g. using ordering component 140) based at least on the score. The ordering can comprise a list of individual media content items belonging to the respective parent populations consolidated into a single list based at least on the ranking At 808, the media content items are ranked (e.g. using ranking component 130) based at least in part on the ordering. The rank can be based at least in part on any one or more of critical rating, number of critical reviews, recency, user interest, user preference, user traffic, popularity, or user demographics. At 810, advertisements are applied to a section of the media content items list (e.g. using presentation component 310).

Figure 9:
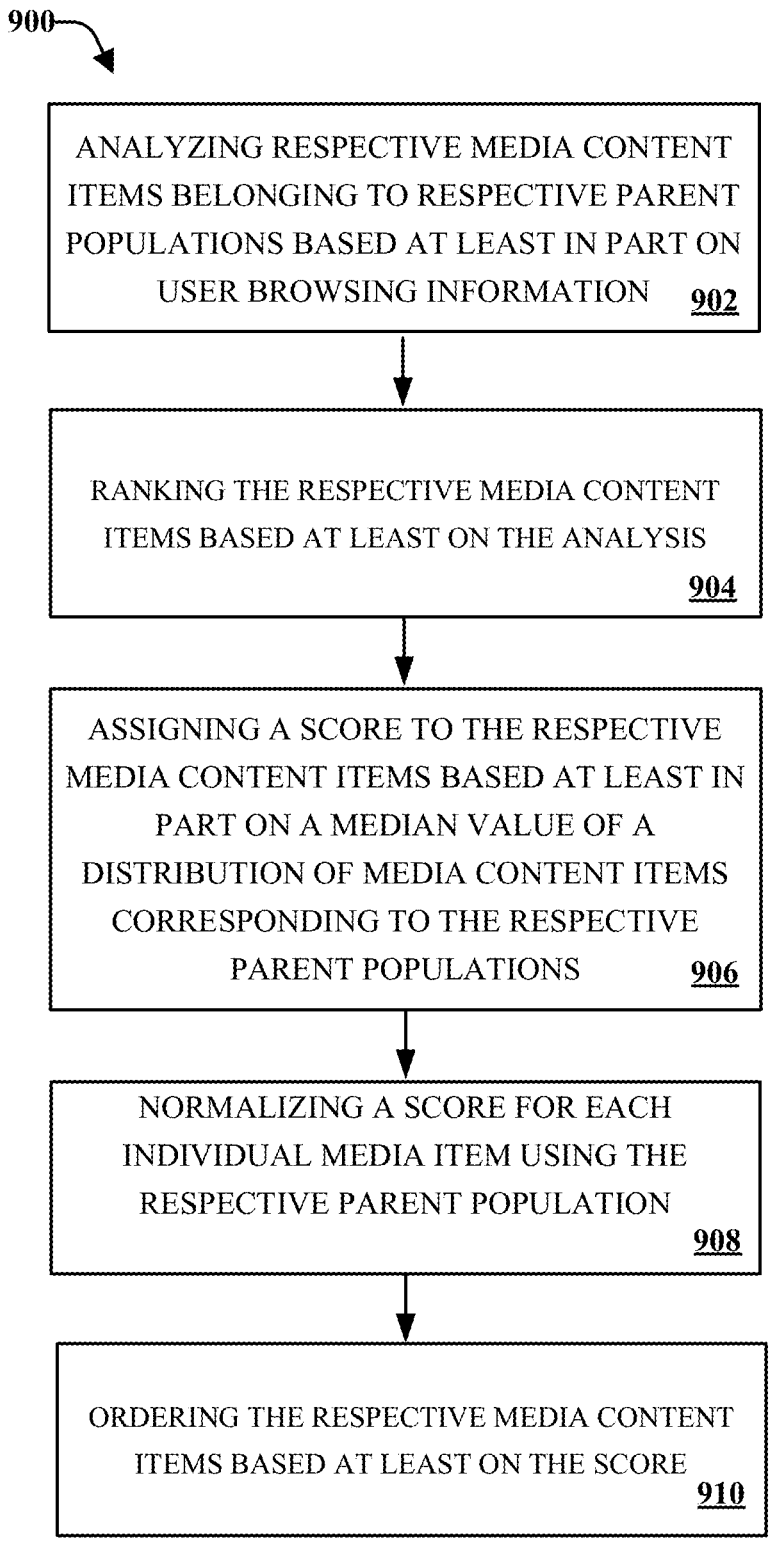
FIG. 9 illustrates an example methodology for analyzing, ranking, scoring, and ordering media content items in accordance with one or more implementations.

Referring now to FIG. 9, presented is a flow diagram of an example application of blended ranking systems disclosed in this description accordance with an embodiment. In an aspect, exemplary methodology 900 of a blended ranking system is stored in a memory and utilizes a processor to execute computer executable instructions to perform functions. At 902, blended ranking system analyzes (e.g. using an analysis component 110) respective media content items belonging to respective parent populations based at least in part on user browsing information. The analysis can be based on social network generated tags related to the respective media content items. At 904, the media content items are ranked (e.g. using ranking component 130) based at least in part on the analysis. The rank can be based at least in part on any one or more of critical rating, number of critical reviews, recency, user interest, user preference, user traffic, popularity, or user demographics. At 906, the media content items are assigned a score (e.g. using scoring component 120) based at least in part on a median value of a distribution of media content items corresponding to the respective parent populations. At 908, the score for each individual media item is normalized using the median value for the respective parent population. At 910, the media content items are ordered (e.g. using ordering component 140) based at least on the score. The ordering can comprise a list of individual media content items belonging to the respective parent populations consolidated into a single list based at least on the score.

Figure 10:
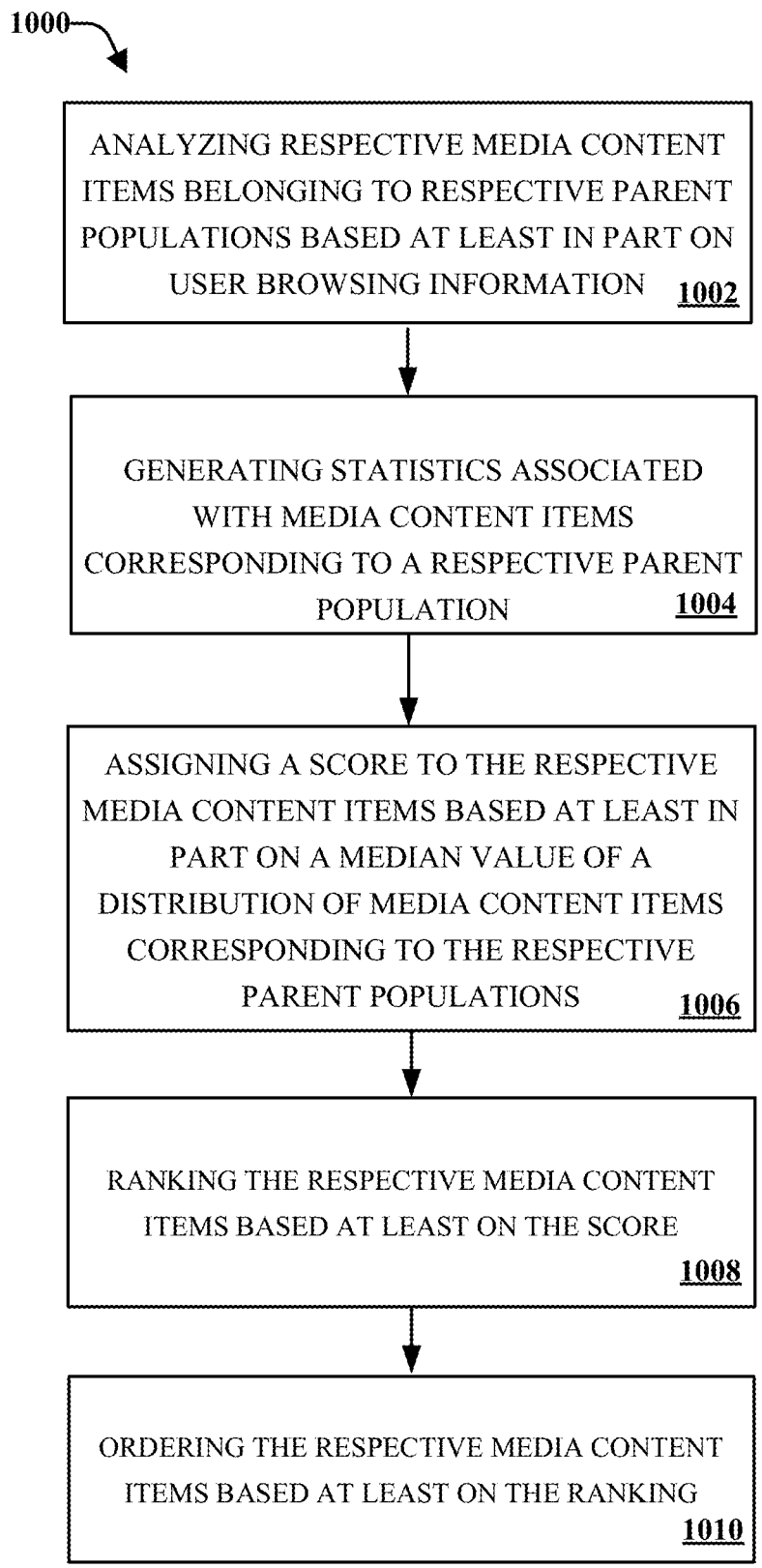
FIG. 10 illustrates an example methodology for analyzing, generating statistics, scoring, ranking, and ordering media content items in accordance with one or more implementations.

Referring now to FIG. 10, presented is a flow diagram of an example application of blended ranking systems disclosed in this description accordance with an embodiment. In an aspect, exemplary methodology 1000 of a blended ranking system is stored in a memory and utilizes a processor to execute computer executable instructions to perform functions. At 1002, blended ranking system analyzes (e.g. using an analysis component 110) respective media content items belonging to respective parent populations based at least in part on user browsing information. The analysis can be based on social network generated tags related to the respective media content items. At 1004, statistics associated with media content items corresponding to a respective parent population are generated (e.g. using statistics component 210).

At 1006, the media content items are assigned a score (e.g. using scoring component 120) based at least in part on a median value of a distribution of media content items corresponding to the respective parent populations. The score for each individual media item can be normalized using the median value for the respective parent population. At 1008, the media content items are ranked (e.g. using ranking component 130) based at least in part on the score. The rank can be based at least in part on any one or more of critical rating, number of critical reviews, recency, user interest, user preference, user traffic, popularity, or user demographics. At 1010, the media content items are ordered (e.g. using ordering component 140) based at least on the ranking. The ordering can comprise a blend of the media content items belonging to the respective parent populations with dissimilar distributions based at least on the median value of the respective parent populations.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 11:
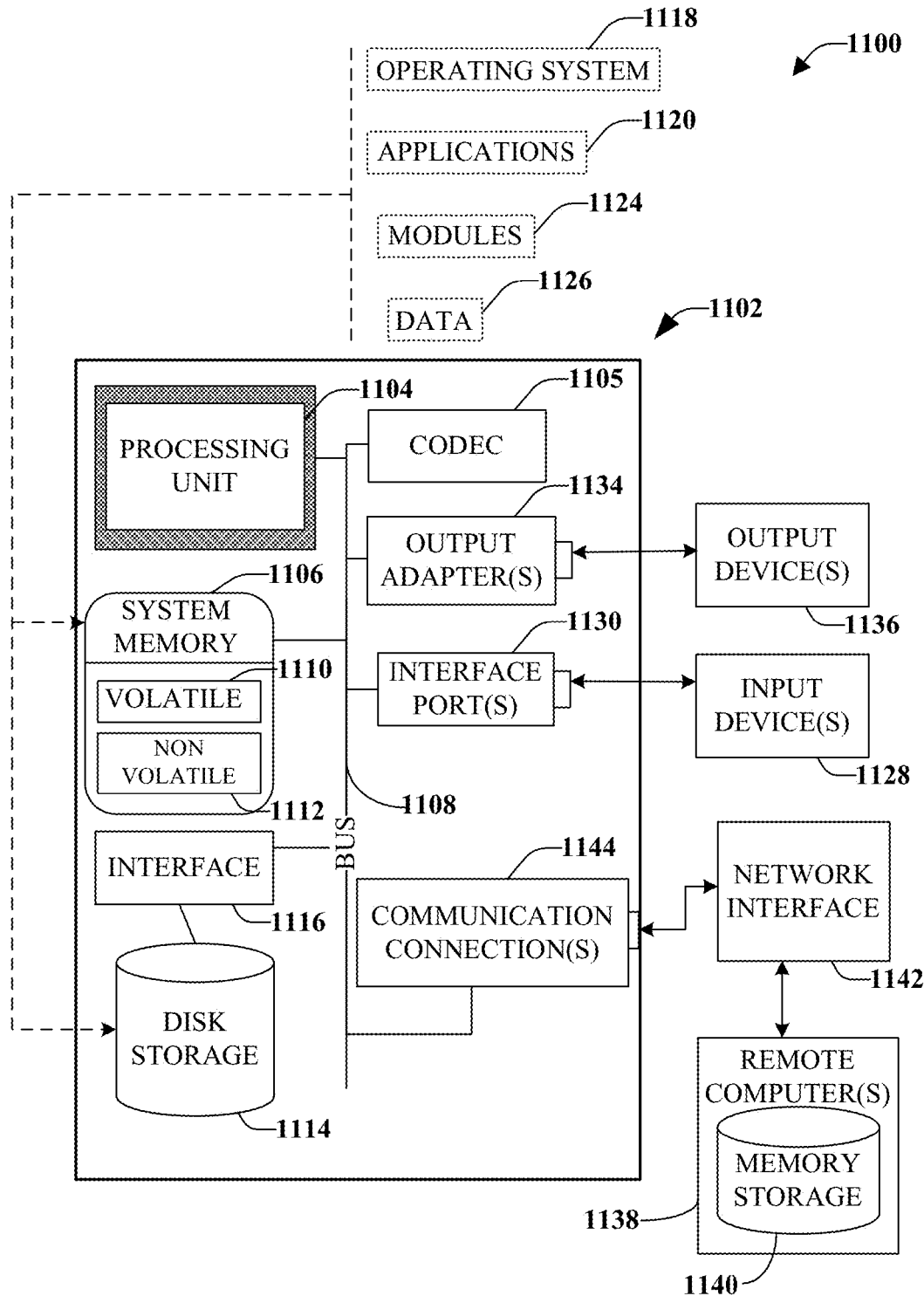
FIG. 11 is a block diagram representing an exemplary non-limiting networked environment in which the various embodiments can be implemented.

With reference to FIG. 11, a suitable environment 1100 for implementing various aspects of the claimed subject matter includes a computer 1102. The computer 1102 includes a processing unit 1104, a system memory 1106, a codec 1105, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1106 includes volatile memory 1110 and non-volatile memory 1112. The basic input/output system (BIOS), containing the basic routines to transfer information between elements within the computer 1102, such as during start-up, is stored in non-volatile memory 1112. In addition, according to present innovations, codec 1105 may include at least one of an encoder or decoder, wherein the at least one of an encoder or decoder may consist of hardware, a combination of hardware and software, or software. Although, codec 1105 is depicted as a separate component, codec 1105 may be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or flash memory. Volatile memory 1110 includes random access memory (RAM), which acts as external cache memory. According to present aspects, the volatile memory may store the write operation retry logic (not shown in FIG. 11) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1102 may also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used, such as interface 1116.

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer system 1102. Applications 1120 take advantage of the management of resources by the operating system through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s) 1128. Thus, for example, a USB port may be used to provide input to computer 1102, and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices and/or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

Figure 12:
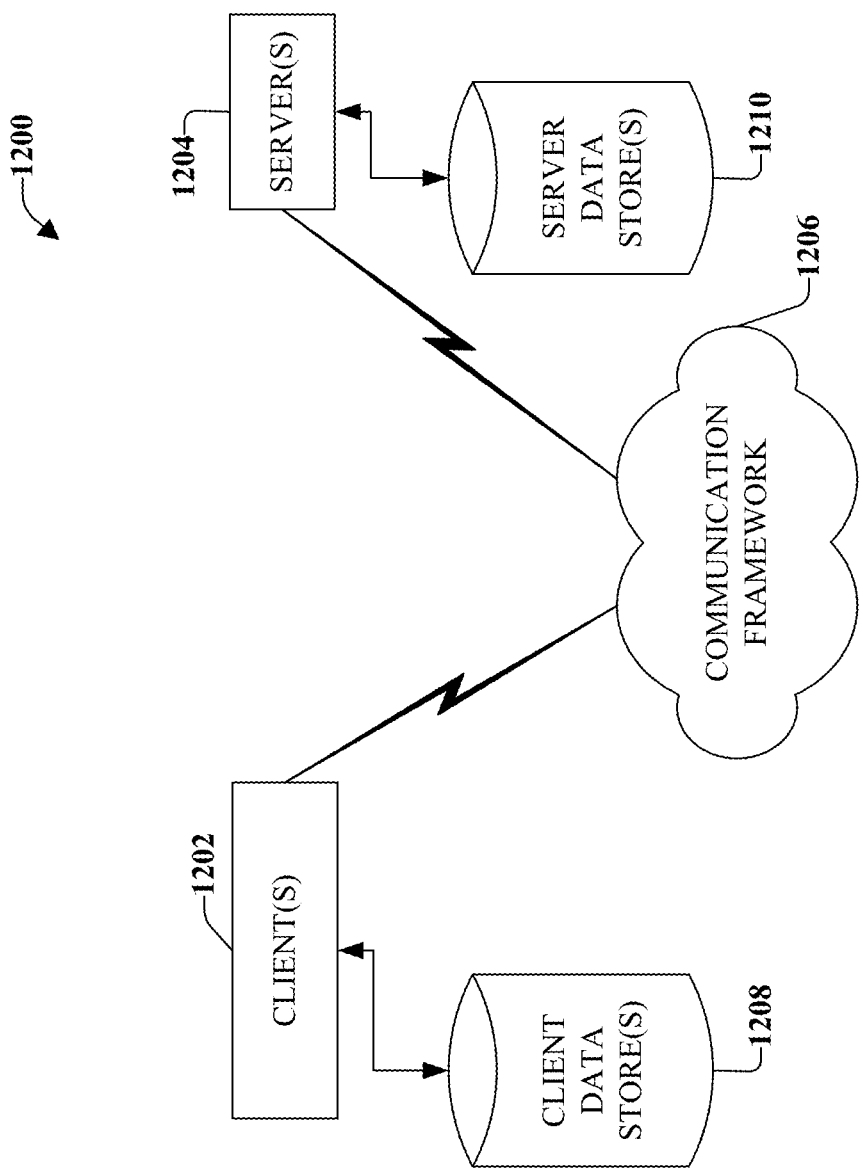
FIG. 12 is a block diagram representing an exemplary non-limiting computing system or operating environment in which the various embodiments may be implemented.

Referring now to FIG. 12, there is illustrated a schematic block diagram of a computing environment 1200 in accordance with this disclosure. The system 1200 includes one or more client(s) 1202 (e.g., laptops, smart phones, PDAs, media players, computers, portable electronic devices, tablets, and the like). The client(s) 1202 can be hardware and/or software (e.g., threads, processes, computing devices). The system 1200 also includes one or more server(s) 1204. The server(s) 1204 can also be hardware or hardware in combination with software (e.g., threads, processes, computing devices). The servers 1204 can house threads to perform transformations by employing aspects of this disclosure, for example. One possible communication between a client 1202 and a server 1204 can be in the form of a data packet transmitted between two or more computer processes wherein the data packet may include video data. The data packet can include a metadata, such as associated contextual information for example. The system 1200 includes a communication framework 1206 (e.g., a global communication network such as the Internet, or mobile network(s)) that can be employed to facilitate communications between the client(s) 1202 and the server(s) 1204.

Communications can be facilitated via a wired (including optical fiber) and/or wireless technology. The client(s) 1202 include or are operatively connected to one or more client data store(s) 1208 that can be employed to store information local to the client(s) 1202 (e.g., associated contextual information). Similarly, the server(s) 1204 are operatively include or are operatively connected to one or more server data store(s) 1210 that can be employed to store information local to the servers 1204.

In one embodiment, a client 1202 can transfer an encoded file, in accordance with the disclosed subject matter, to server 1204. Server 1204 can store the file, decode the file, or transmit the file to another client 1202. It is to be appreciated, that a client 1202 can also transfer uncompressed file to a server 1204 and server 1204 can compress the file in accordance with the disclosed subject matter. Likewise, server 1204 can encode video information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system comprising:
    a memory having stored thereon computer executable components; and
    a processor configured to execute the following computer executable components stored in the memory:
        an analysis component that analyzes social network tags related to media content items belonging to respective parent populations based at least in part on user browsing information to determine user interest of the media content items, wherein the respective parent populations contain statistical information associated with the population of media content items, the statistical information comprising at least organization and interpretation of data within the population;
        a scoring component that assigns respective scores to the media content items based at least in part on a distribution of media content items corresponding to the respective parent populations according to the following:
            determine respective view counts for media content items of the parent populations;
            group respective view counts into buckets by powers of ten for the parent populations;
            identify respective buckets for parent populations having a maximum count value;
            determine respective geometric means of the respective buckets for parent populations having the maximum count value;
            determine respective offsets for the parent populations based upon respective differences between the geometric means; and
            determine the respective scores of media content items based upon the respective offsets of the parent populations; and
        a ranking component that ranks the media content items based at least in part on the respective scores; and
        an ordering component that aggregates the media content items belonging to the respective parent populations into an ordered list based at least in part on the ranking.

2. The system of claim 1, wherein the analysis component employs a statistical generator component that generates statistics associated with media content items corresponding to a respective parent population.

3. The system of claim 1 comprising a presentation component that generates a display of the ordered media content items.

4. The system of claim 1, wherein the media content items are at least one of movie items, audio items, image items, downloadable applications, or other downloadable software or media.

5. The system of claim 1, wherein at least one parent population comprises free media content items.

6. The system of claim 1, wherein at least one parent population comprises paid-for media content items.

7. The system of claim 1, wherein the view count represents at least one of consumption of a media content item, a click of the media content item, a download of the media content item, or an installation of the media content item.

8. The system of claim 1, wherein the ordering component further lists a blend of the media content items belonging to the respective parent populations with dissimilar distributions based at least on respective median view count values of the respective parent populations.

9. The system of claim 1, wherein the ranking component ranks the media content items further based at least in part on at least one of critical rating, number of critical reviews, recency, user preference, user traffic, popularity, or user demographics.

10. The system of claim 1, comprising an advertisement component that applies an advertisement to a section of the list.

11. The system of claim 1, wherein the distribution of media content items is a median distribution.

12. A method, comprising:
    analyzing, by a system including a processor, social network tags related to media content items belonging to respective parent populations based at least in part on user browsing information to determine user interest of the media content items, wherein the respective parent populations contain statistical information associated with the population of media content items, the statistical information comprising at least organization and interpretation of data within the population;
    assigning, by the system, respective scores to the media content items based at least in part on a distribution of media content items corresponding to the respective parent populations, the assigning comprising:
        ascertaining respective view counts for media content items of the parent populations;
        grouping respective view counts into buckets by powers of ten for the parent populations;
        identifying respective buckets for parent populations having a maximum count value;
        ascertaining respective geometric means of the respective buckets for parent populations having the maximum count value;
        ascertaining respective offsets for the parent populations based upon respective differences between the geometric means; and
        generating the respective scores of media content items based upon the respective offsets of the parent populations; and
    ranking, by the system, the media content items based at least in part on the score; and
    consolidating, by the system, the media content items belonging to the respective parent populations into an ordered list based at least in part on the ranking.

13. The method of claim 12, further comprising generating statistics associated with the respective parent population and assigning the respective scores further based upon the statistics.

14. The method of claim 12, further comprising generating, by the system, a display of the ordered media content items.

15. The method of claim 12, wherein media content items are at least one of a movie item, audio item, image item, downloadable application, or other downloadable software or media.

16. The method of claim 12, wherein at least one parent population comprises free media content items.

17. The method of claim 12, wherein the at least one parent population comprises paid-for media content items.

18. The method of claim 12, wherein the view count represents at least one of consumption of a media content item, a click of the media content item, a download of the media content item, or an installation of the media content item.

19. The method of claim 12, further comprising listing, by the system, a blend of the media content items belonging to the respective parent populations with dissimilar distributions based at least on respective median view count values of the parent populations.

20. The method of claim 12, further comprising ranking the media content items further based at least in part on at least one of critical rating, number of critical reviews, recency, user interest, user preference, user traffic, popularity, or user demographics.

21. The method of claim 12, further comprising applying, by the system, an advertisement to a section of the list.

22. A non-transitory computer-readable medium having instructions stored thereon that, in response to execution, cause a system including a processor to perform operations comprising:

analyzing social network tags related to media content items belonging to respective parent populations based at least in part on user browsing information to determine user interest of the media content items, wherein the respective parent populations contain statistical information associated with the population of media content items, the statistical information comprising at least organization and interpretation of data within the population;

assigning respective scores to the media content items based at least in part on a distribution of media content items corresponding to the respective parent populations, the assigning comprising:

determining respective view counts for media content items of the parent populations;

grouping respective view counts into buckets by powers of ten for the parent populations;

identifying respective buckets for parent populations having a maximum count value;

determining respective geometric means of the respective buckets for parent populations having the maximum count value;

determining respective offsets for the parent populations based upon respective differences between the geometric means;

determining the respective scores of media content items based upon the respective offsets of the parent populations; and ranking the media content items based at least in part on the score; and accumulating the media content items belonging to the respective parent populations into an ordered list based at least in part on the ranking.

* * * * *